United States Patent [19]

Tellier et al.

[11] 4,365,561

[45] Dec. 28, 1982

[54] COMPUTER TERMINAL STATION FOR DATA INPUT AND OUTPUT

[75] Inventors: Pierre Tellier, Villevaude; Jean-Pierre Demaille, Saint Maur; Jean Doillon, Montry, Esbly, all of France

[73] Assignee: Compagnie du Roneo, Paris, France

[21] Appl. No.: 83,586

[22] Filed: Oct. 11, 1979

[30] Foreign Application Priority Data

Oct. 12, 1978 [FR] France .............................. 78 29159
Jan. 15, 1979 [FR] France .............................. 79 00902

[51] Int. Cl.³ .......................... A47F 5/12; A47B 9/08; A47B 11/00
[52] U.S. Cl. .......................................... 108/7; 108/20; 108/32; 108/142
[58] Field of Search ............... 108/32, 139, 141, 142, 108/102, 105, 4, 5, 7, 8, 20; 248/396; 364/708

[56] References Cited

U.S. PATENT DOCUMENTS

| 1,851,906 | 3/1932 | Henderson | 108/32 X |
| 2,252,215 | 8/1941 | Stearns | 108/7 X |
| 2,494,242 | 1/1950 | Hardy | 108/139 |
| 2,495,250 | 1/1950 | Gilly | 108/142 X |
| 2,639,541 | 5/1953 | Le Tang | 108/7 |
| 3,060,624 | 10/1962 | Wenger | 108/7 |
| 3,069,543 | 12/1962 | Sazausky | 108/7 X |
| 3,405,900 | 10/1968 | Robinson | 248/396 |
| 3,880,096 | 4/1975 | Kaplan | 108/142 X |

FOREIGN PATENT DOCUMENTS 122425 8/1948 Sweden ............................. 108/141

Primary Examiner—William E. Lyddane
Attorney, Agent, or Firm—James E. Nilles

[57] ABSTRACT

The invention relates to a computer terminal station constituted by an input device and by an output device, both devices being separate one from the other.

According to the invention, the station comprises a support for the device 2 constituted by a column mounted for sliding along its axis in a stand, and for rotation about its axis with respect to said stand, the top part of the said column being provided with a console mounted to pivot about an inclinable axis for the output device whereas between the column and the stand are provided means for their axial immobilization in relative rotation and whereas between the column and the console are provided means for adjusting the inclination of the console.

12 Claims, 10 Drawing Figures

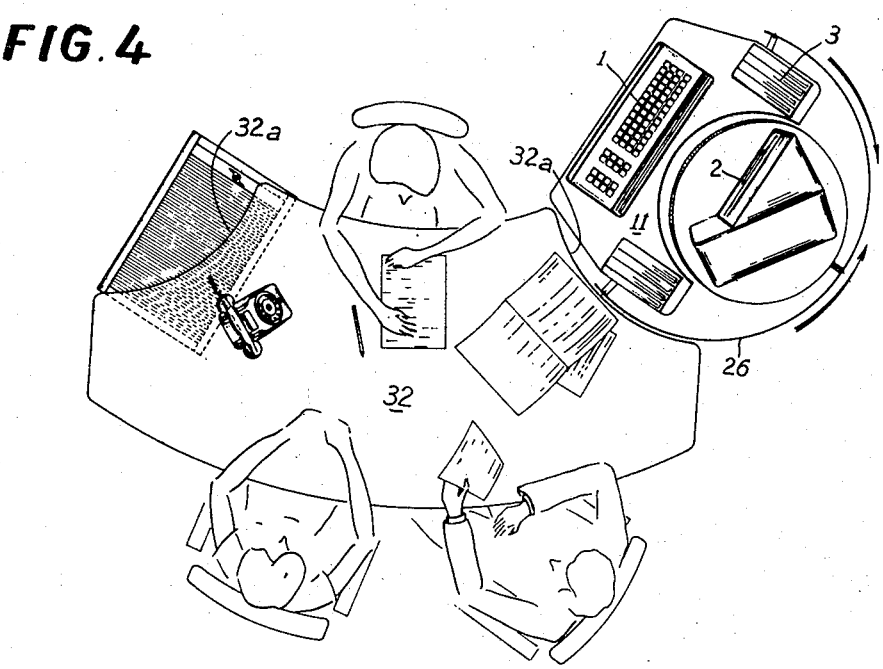
FIG. 4
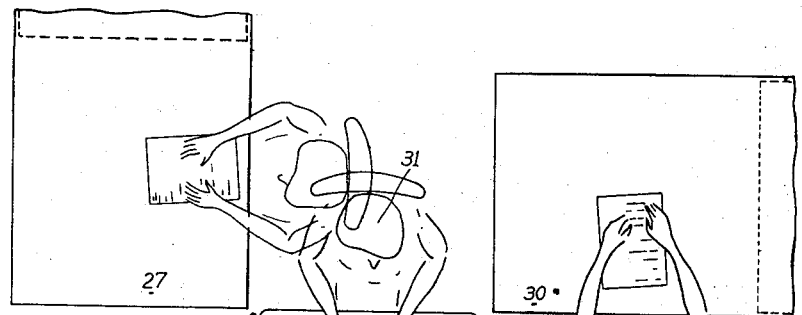
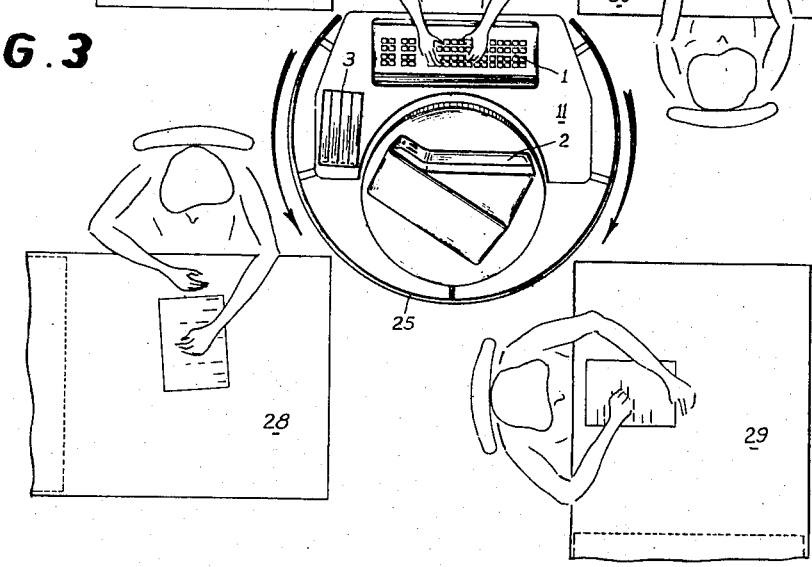
FIG. 3

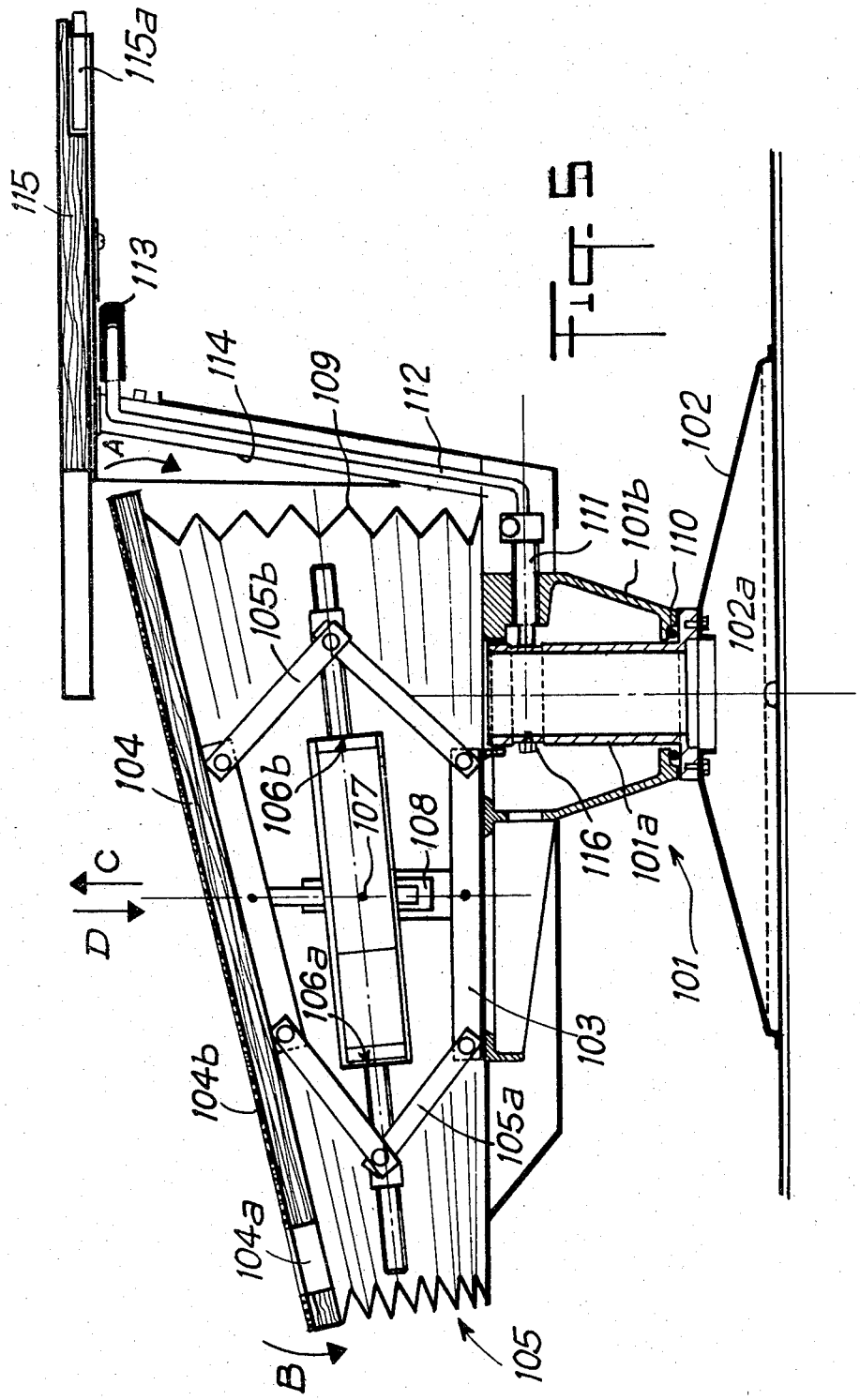

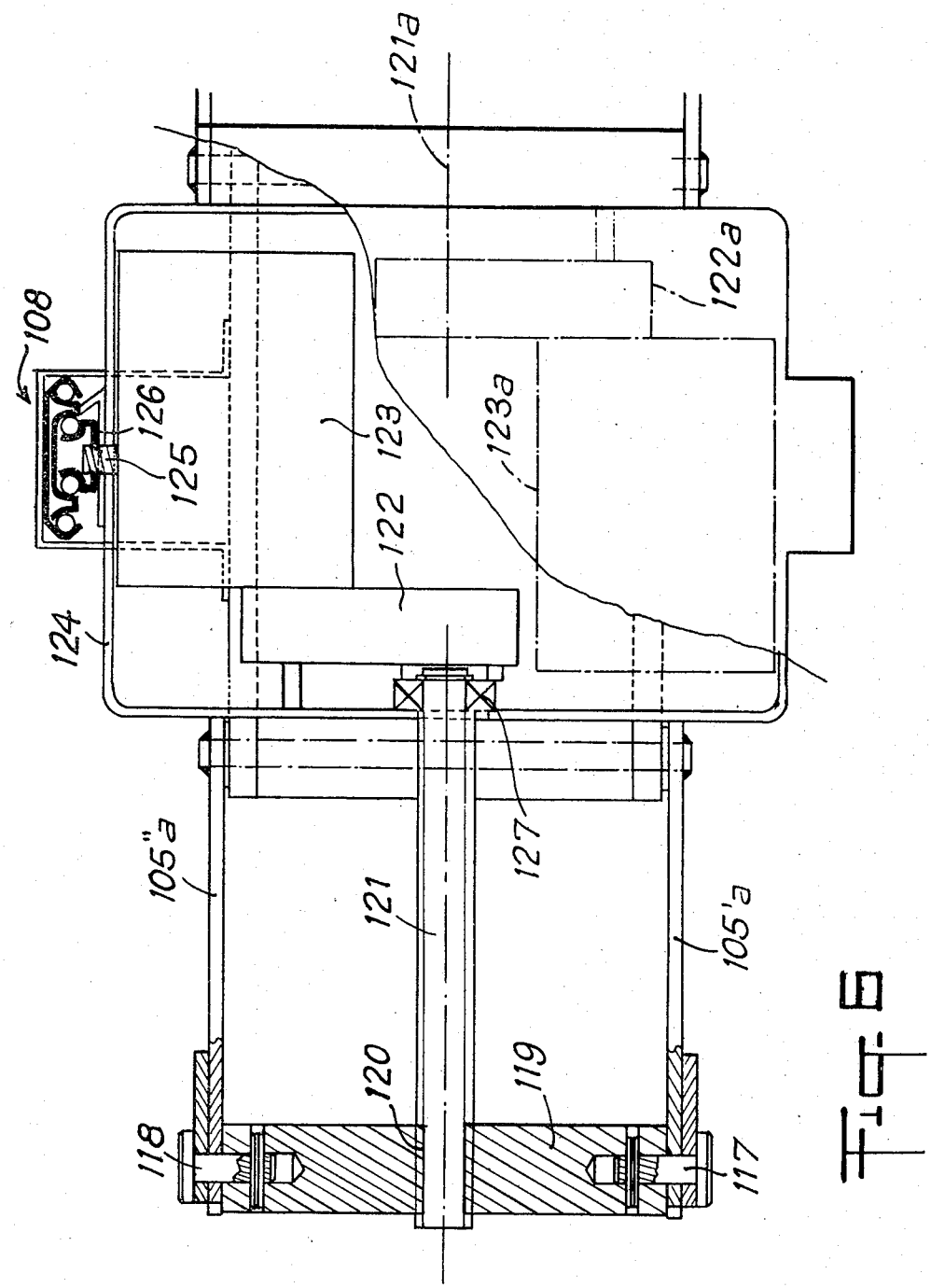

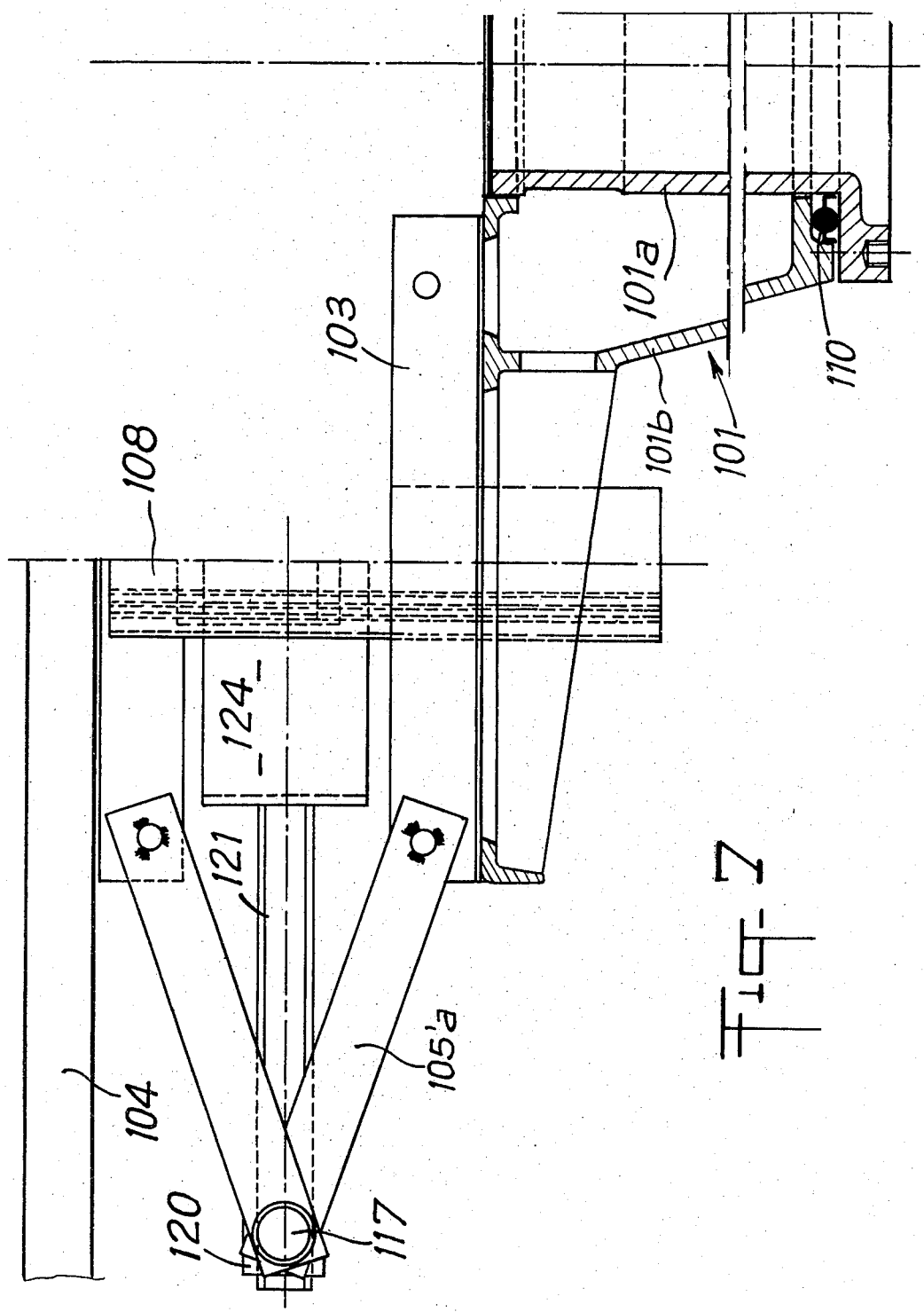

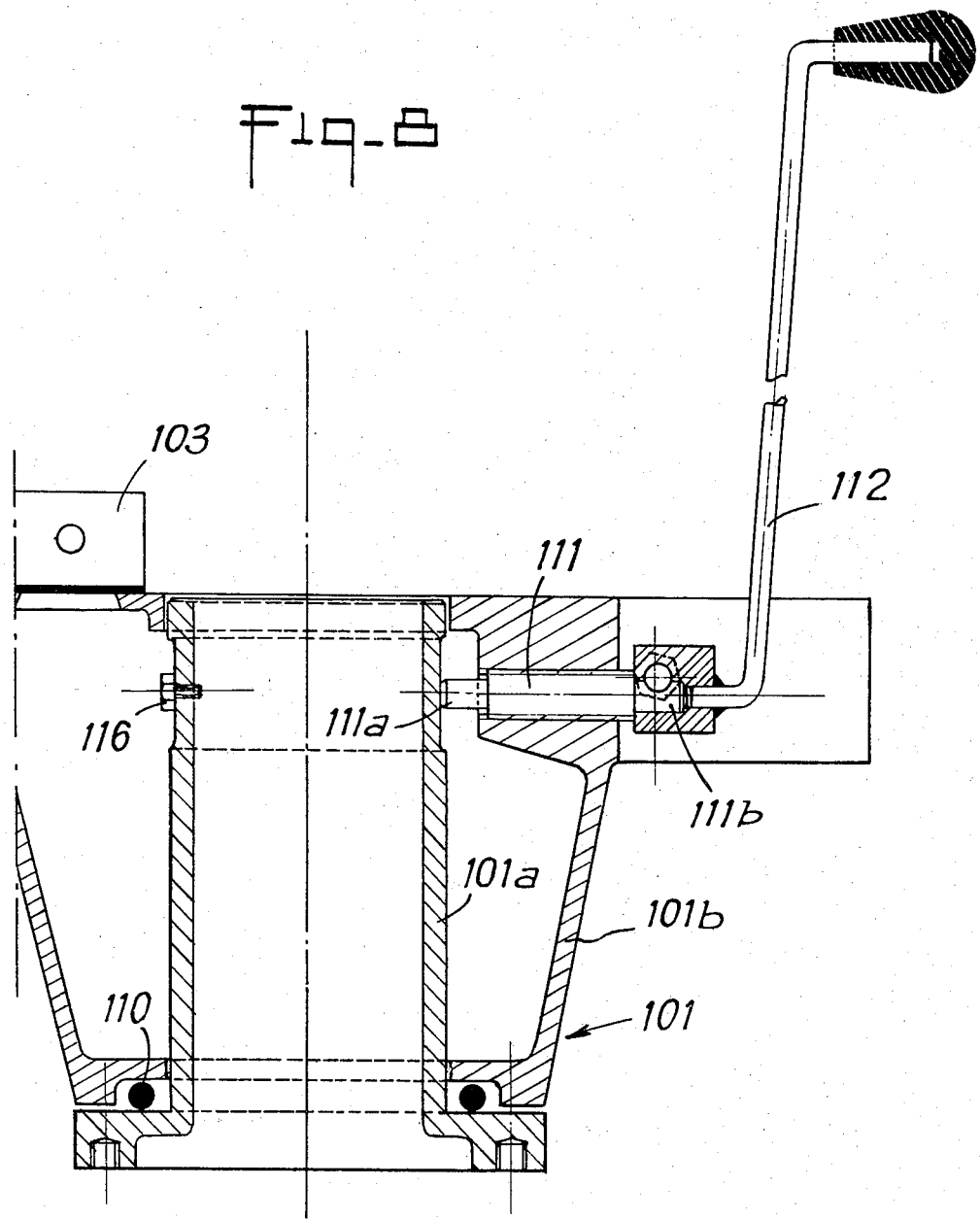

COMPUTER TERMINAL STATION FOR DATA INPUT AND OUTPUT

The present invention relates to a work station connected with data processing equipment (such as computers and other calculators). Its precise object is the operating and processing unit of a computer terminal wherefrom consultations are made or where data is entered into the central processor, and whereon answers or output data can be collected.

Such stations can comprise a data entry or enquiring keyboard. Said device can consist in a printer and/or a luminous display unit such as a receiver screen.

The working conditions of the operator raise a number of problems. Indeed, he should be in a position to see, without straining, the data input and output member and to have manual access to the data input device and to any device that may be provided for the transcription of output data, when such data is displayed on a screen.

The station, therefore, should be as accurately adaptable as possible to the ergonomical data that is specific to each operator, in the case of only one operator, or easily adjustable in the case of more than one operator using the station. The ambient atmosphere should also be accounted for, such as noise and lighting for example, and controls should be provided to place the station in the best lighting conditions possible and to sound-insulate it from the environment. Finally, it may prove advantageous to have one unit only, adapted to be used by several operators from their normal working position.

The present invention proposes an assembly of means permitting by a limited number of easy and instant adjustments, to meet all the requirements of a unit offering good working conditions whilst being attractive in design.

It is therefore its object to propose to this effect, a terminal station for the input and output of data issued from and directed to a central processor, such as a computer for example, constituted by a hand-operated input device of the keyboard type and by an output device which the operator can read over, the input and output devices being separate one from the other.

According to the invention, said station comprises a support for the said output device and a support for the said input device, wherein the support for the said output device is composed of a platform connected to a mechanism for adjusting its height and its inclination, which mechanism is mounted for rotation about a vertical axis in a lower base or stand with means for immobilizing it in rotation in said base, the inclination of the platform being ensured about an axis, in theory at least, which is horizontal and overhung with respect to the aforesaid vertical axis and the support for the said input device is composed by a jamb, fast with the part of the said means which is rotatable with respect to the said base, and shaped at its upper part into a console supporting a horizontal panel cut so as to surround at least part of the said platform and to be substantially inscribed in a circle centered on the axis of the column and surrounding the support for the output device.

In a first embodiment of the invention, the said mechanism is constituted by a lower horizontal base-plate coupled to the upper end of a vertical column pivotally mounted in the said stand and by a system of hinged arms or compasses extending between the said platform and the said base-plate and forming therewith, from an elevational standpoint, a deformable hinged hexagon, whereas a member for controlling and adjusting the aperture of each of the said compasses is coupled between the latter and a fixed member, fast with the said support.

Preferably, the hinged arms system comprises two double compasses, each double compass being formed by two parallel compasses spaced apart cross-wise and connected together by a cross-member situated at the level of their hinged connection.

The said control and adjusting member may thus be constituted by a threaded rod cooperating by one of its ends with a tapped hole provided in the said cross-member perpendicular to its axis and coupled by its other end to a member of its rotation means, which is itself connected to the support via a hinged connection whose axis is adapted to be moved in a fixed vertical guide.

In a second emnbodiment, the said mechanism is constituted by a column which is adjustably mounted for vertical sliding and for rotation in the said stand the upper part of the said column being fitted with a casing forming support for the pivoting axis of the said platform which has an extension extending into the casing beyond the pivoting axis whereas means for adjusting the inclination of the platform are constituted by a screw-and-nut system of which the screw is immobilized in translation on the casing and the nut is fast with the said extension.

Advantageously, the platform is covered with a non-slip material such as a plastic foam material.

The station further comprises, adjacent the panel supporting the input device, a horizontal handrail, situated along the said circle and fixed to the rotating part of the unit, the said handrail being interrupted over a length which corresponds to the zone of access to the input device.

Said station can also be surrounded with a substantially cylindrical screen along the said circle, such screen being of vertical axis coupled to the part of said station which is movable in rotation and open laterally on the side of the board so as to clear an access to the input device.

Finally, in order to avoid too great an amplitude of rotation which could damage the cables of the electrical connection, the said stand and the rotatable part of the unit are provided with stop members cooperating to limit the angle of rotation to a value slightly below 360°.

The invention will be better understood and secondary characteristics and advantages will emerge from the following description of the invention given by way of example only and non-restrictively, with reference to the accompanying drawings in which.

Figure 9:
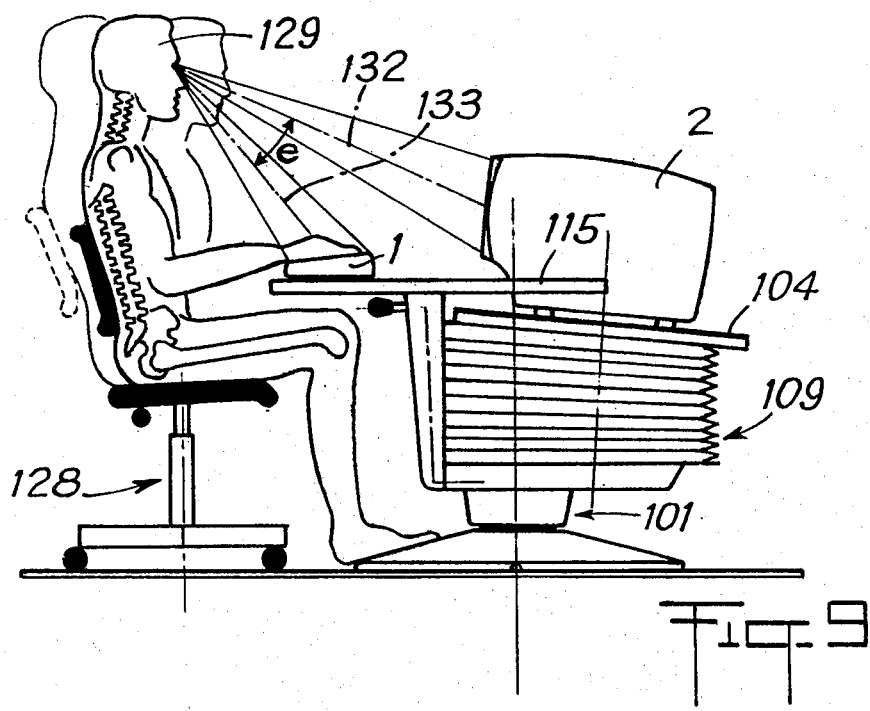
Figure 10:
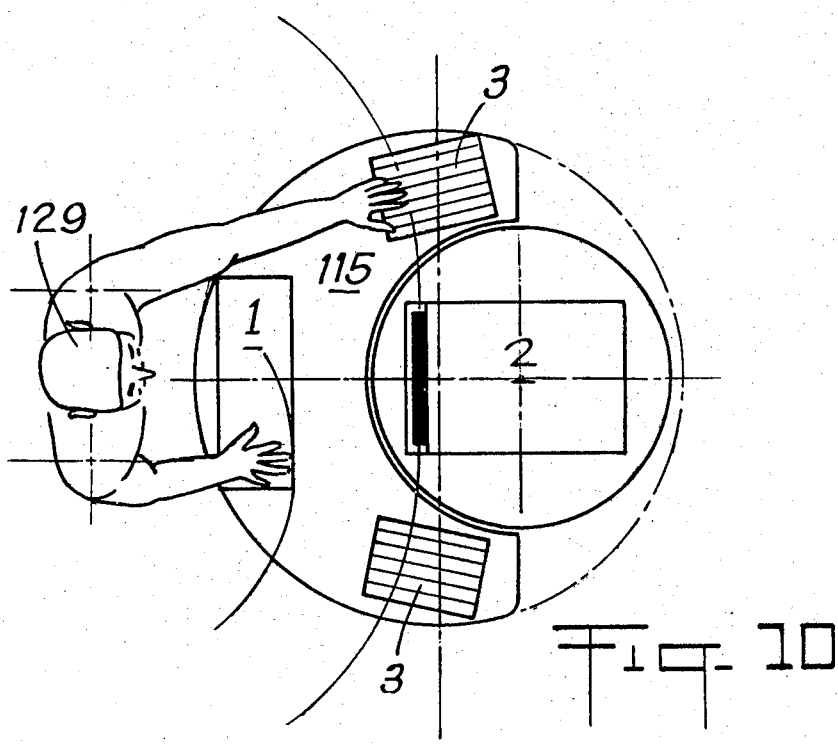

FIG. 3 diagrammatically illustrates an operating station with four permanent operators, as viewed from above;

FIG. 4 illustrates the use of the device according to the invention from a reception desk;

FIG. 5 is a diagrammatical view of the first embodiment described hereinabove of a station according to the invention;

FIGS. 6 and 7 show partial views of the inclinable support mechanism for the receiver screen;

FIG. 8 shows a detail of embodiment of the base column of FIG. 5;

FIGS. 9 and 10 show elevational views from above of the overall arrangement of the station according to FIG. 5.

Figure 1:
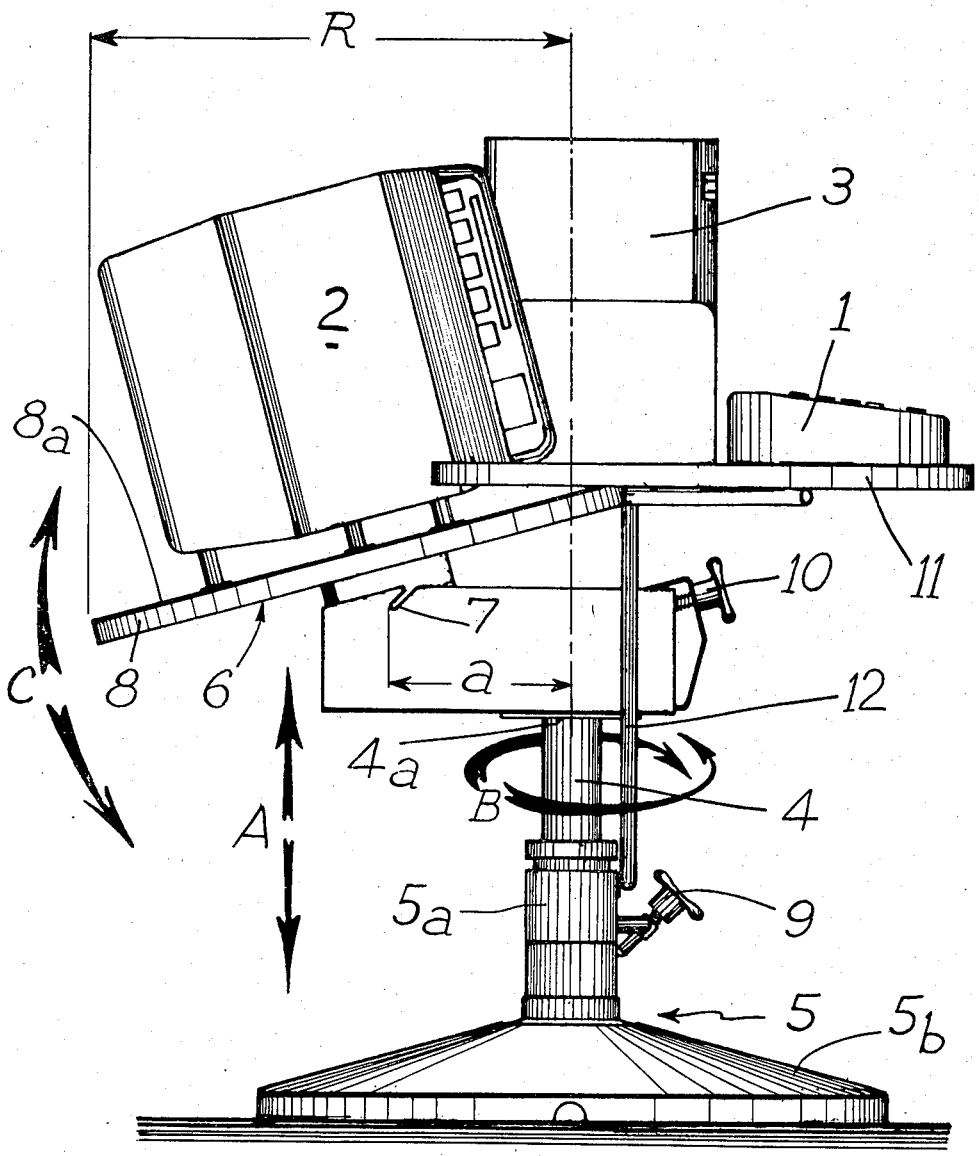
FIG. 1 is an elevational outside view of the second embodiment described hereinabove of the device according to the invention.

Referring first to FIG. 1, there is shown a data input and output terminal station, connected in known manner to a central computer. Said station comprises a data input device 1 and a data output device 2, the latter being separated from the input device. The said device 1 here is a keyboard whereas the device 2 is a receiver comprising a display screen. Said device 2 could as well be a printer. In 3, are shown means (registers, books) permitting either to transcribe or to write the output data, or to find the right codes needed to enter the data on the keyboard 1. The station shown in FIG. 1 is thus especially adapted to "self-service" use, e.g. incidental use by more than one successive operators.

The means constituting the station according to the invention are composed of a support for the receiver 2, which support consists of a support column 4, which is vertical and mounted for sliding along its axis in a stand 5 according to arrows A and for rotation about its axis and with respect to the said stand according to arrows B. The upper part 4a is provided with a console 6, mounted to pivot about a substantially horizontal axis 7. Said console 6 forms a platform 8 for supporting the receiver 2 which is simply resting thereon. To prevent any slipping when the platform is tilted along arrow C, said platform is coated on its upper face with a layer of non-slip materials 8a such as plastic foam for example. Said figure also shows a first knob 9 for hand operation, which makes it possible to immobilize the column 4 in rotation with respect to the stand 5, a second knob 10, also for hand operation, permitting to control the tilting of the plate 8 about its axis 7. Finally, the support of the keyboard 1 comprises a shelf 11 supported by a jamb 12 connected to a part 5a of the stand 5, fast in rotation with the column 4 (as will be shown in more detail in FIG. 2).

It will be noted that the axis of inclination of the platform 8 is overhanging with respect to the vertical axis of the column 4 and at a distance a therefrom. This particular disposition permits to radially balance the station such as it is fitted with its shelf 11, so as to inscribe it inside a horizontal circle of radius substantially equal to R. The advantage of such a disposition which is already interesting from a design standpoint will be explained hereinafter.

Also to be noted is the truncated cone-shape of the base-plate 5b of the stand 5 which may be covered with a non-slip rubber or such like, and constitute a foot-rest for the operator.

Figure 2:
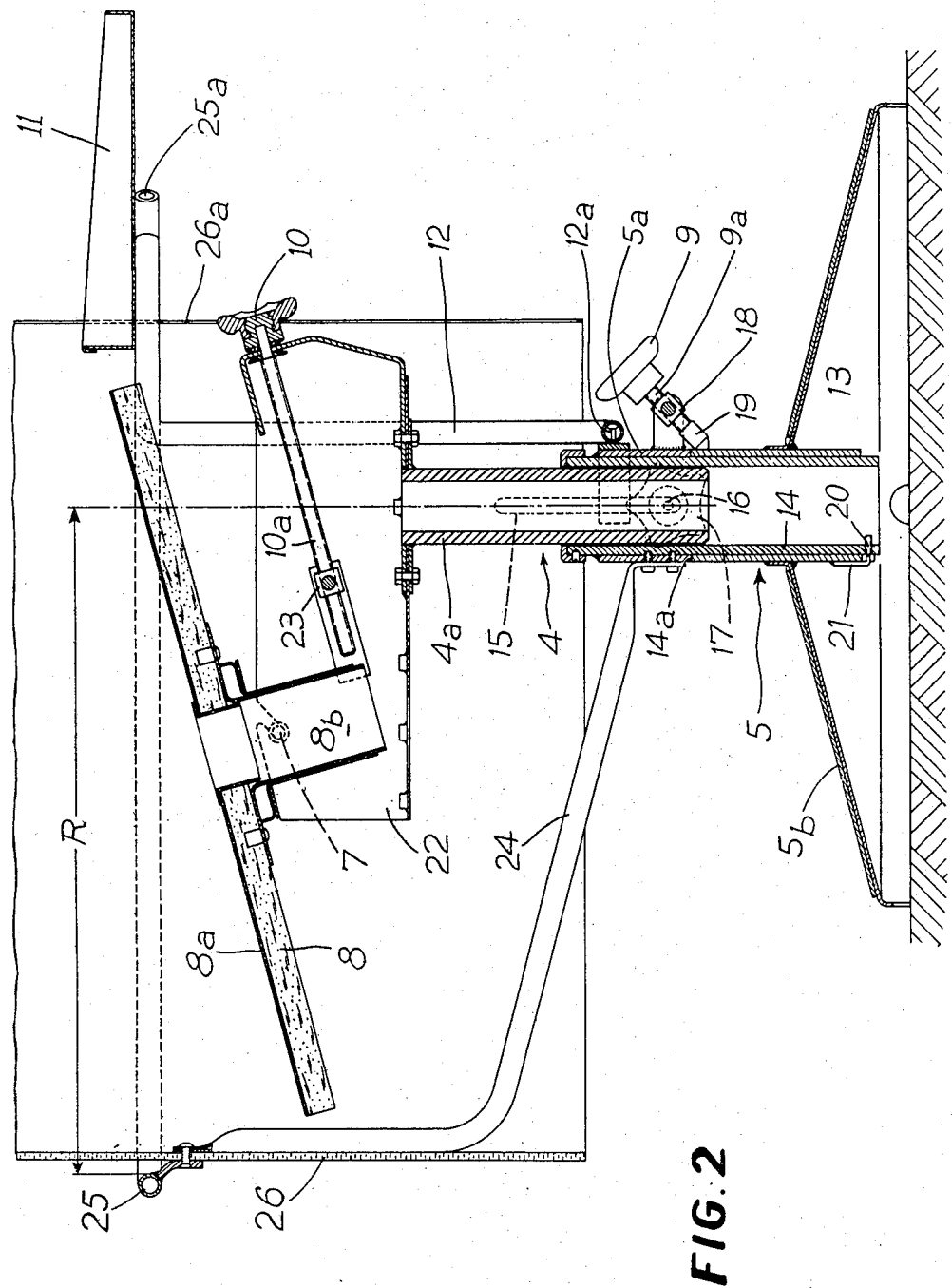
FIG. 2 is a cross-sectional view of the device according to FIG. 1.

FIG. 2 also shows some of the elements described hereinabove and, with the same reference numerals. It further shows that the stand 5 carries, via its truncated cone-shaped base-plate 5b, a substantially vertical first sleeve 13. Said sleeve receives a rotatable second sleeve 14 comprising a shouldering surface 14a by way of which it can rest on the upper end of the shoulder 13. The portion of sleeve 14 situated above the said shoulder 14a, constitutes the rotatable part 5a of the stand 5. The sleeve 14 receives the column 4 sliding therein. Said column 4 is provided with a longitudinal groove 15 along one of its generatrices, the said groove cooperating with the end of a screw 16 which traverses the part 5a of the sleeve 14 and can be operated by a knob 17. The end of the screw 16 acts as a means to stop the rotation of the column 4 on the part 5a, and in its tightened position, it stops the sliding of the column on the sleeve 14. It is thus possible to control the elevation of the column 4.

As to the knob 9, this is fast with a screw 9a which is screwable in a nut 18 carried by the part 5a of the sleeve 14. A housing 19, provided on the sleeve 13, can receive the end of the screw 9a and stop the rotation of the sleeve 14 on the stand 5, and as a result, the column 4 on the stand. It will have been noted that the question here is that of angular indexing in one position only, as opposed to the variable adjustment of the elevation.

When the screw 9a is released from the housing 19, the assembly 4, 14 can rotate with respect to the stand 5. However, in order to prevent a rotation greater than about 360°—which would damage the electrical connections—the sleeve 14 is provided at its base with a screw 20, whose head, situated on the outside, is projecting and can come into contact with either side of an abutment 21 placed on its path by the rotation movement and provided by the lower part of the sleeve 13. The upper part 4a of the column bears a casing 22 which constitutes the support for the said axis 7. The platform 8 comprises an extension 8b extending into the casing 22 beyond the axis 7. To this extension is hingedly fitted a nut 23 of a nut-and-screw system, of which the screw 10a is integral with the knob 10 controlling the tilting of the platform 8. The screw 10a is fast in translation with the casing 22. It is thus clear that the actuation of the knob 10 causes the movement of the screw 23 and, as a result, the tilting of the platform about the axis 7.

FIG. 2 further shows that the jamb 12 supporting the shelf 11 is secured by its lower part 12a to a stirrup piece integral with the part 5a of the sleeve 14. In this way, the height of the shelf 11 is not adjustable, but said shelf can rotate with the assembly. A jamb 24 is also shown to be secured to the said part 5a, thereby constituting a coupling element for a circular handrail 25 and for a screen 26 protecting and insulating the station according to the invention. Said screen 26 is substantially cylindrical and, in the same way as the handrail, is interrupted to provide an access to the station on the side of the shelf 11 (see ends 25a of the handrail and 26a of the screen). It will be noted that the handrail and the screen have a radius substantially equal to the said radius R and inscribe the totality of the station.

FIG. 3 illustrates, as viewed from above, the lay-out of the station according to the invention, adapted for use by four people seated in permanence at working desks 27, 28, 29 and 30. The handrail 25 is used to bring the unit towards the operator or away from him. The station can be used, as illustrated, by the operator 31 who can adjust it, in part at least, to suit his convenience (for example, to correct the direction of the screen in relation to the incidence of the lighting.)

Finally, FIG. 4 shows the station according to the invention fitted close to a reception desk. Said station is provided with its screen 26 and fits in a corresponding indentation 32a provided to this effect at the ends of the desk 32. In this way the input and output of data can be done, away from onlookers and from the noisy atmosphere.

Referring now to FIG. 5, this shows another embodiment of the data input and output terminal according to the invention. The input and output devices are not shown.

The support according to the invention is composed of a vertical support column 101 of which a hub 101a is integral with a base 102 and of which the outer part 101b, which may be issued from foundry, is mounted for rotation on the said hub 101a. The said hub 101a will then be a tube whilst the base 102 will advantageously be made of spun steel plate, coated with a protective paint and an outer coating so as to form a non-slip foot-rest. The upper end of the said part 101b is provided with a substantially horizontal base-plate 103. A platform 104 provided to receive the screen receiver (not shown) is connected to the said base-plate 103 by a system of hinged arms 105.

Said system, diagrammatically shown in elevation in FIG. 5, comprises two compasses 105a and 105b, each one being hinged by the free end of its arms to the base-plate 103 and to the platform 104 respectively. It is shown that the platform, the base-plate and the compass, form in the plane of FIG. 5, a deformable hexagon and that by varying the opening angle of either one or both arms of the compass, the platform 104 is caused to tilt backwards or frontwards according to arrows A and B and/or to be raised or lowered along arrows C and D. The variation of the said opening angle is produced by means of members 106a for the compass 105a and 106b for the compass 105b, diagrammatically shown in this figure, but of which a preferred embodiment is shown in FIGS. 2 and 3. Said members 106a and 106b for controlling the opening angle of the compasses are joined to a fixed portion of the support (in the present example, the base-plate 103) by means of a transverse pivoting axis 107 which is adapted to move in a fixed vertical guide 108. In 109, there is shown a concertina-type protection for the inclinable support mechanism, positioned between the base-plate 103 and the platform 104.

It will be further noted in said figure and in FIG. 8 which is a detailed view thereof, that the part 101b of the column 101, mounted for rotation about a hub 101a, rests on the base 102 by means of a thrust ball bearing 110. Moreover, a screw 111 penetrates through the upper end of the said part 101b via a tapped hole and can come to bear against the tube 101a by its end 111a. Its other end 111b is secured to a lever 112 which is cranked upwards and provided with an operating handle 113. By acting on the handle in a direction perpendicular to the plane of the figures, the screw 111 is set into rotation about its axis and it is then possible to lock the part 101b on the hub 101a in any angular relative direction of the two parts 101a and 101b.

FIG. 5 also shows a support for the data input device, consisting of two tubes 114, one of which only is shown, and a shelf 115 meant to receive the keyboard not shown. Said tubes 114 are joined by their lower end to the said part 101b of the column whereas their open upper end receives vertically a plug, not shown, integral with the platform 115 and perpendicular thereto. The height of the shelf 115 is adjustable with respect to the tubes 114 for example by means of a screw engaging transversely each plug and lockable on the corresponding tube across an oblong vertical opening whose length determines the control range.

FIG. 5 also shows an orifice 102a provided at the foot of the stand 102 for letting through the connection cables of the data output device, which cables thereafter go through the part 101a to finally emerge on the level of the platform 104 via the orifice 104a. Other cables can also be housed in the base and in the column through the said passage, and in particular the ones feeding the members 106a and 106b and the ones connecting the keyboard to the computer unit. In this way, a protection is ensured against accidental pulling or breakages of the said cables when the device is rotated about its pivot 101a.

And lastly, a screw 116 (see FIGS. 5 and 8) placed on the upper part of the pivot 101a, constitutes a means to stop the rotation of the device about the said pivot limiting said rotation to a little less than 360°, the head of the screw 116 being situated on the path of the end 111a of the screw 111.

FIGS. 6 and 7 show a number of the elements that have already been described, and with the same reference numerals. These figures are substantially half-views from above and in elevation respectively, of the inclinable device supporting the screen. In this embodiment, the compasses such as 105a are in effect constituted by two compasses 105'a and 105"a parallel but transversely set apart. Their hinges 117, 118 are joined together by a cross-piece 119 provided with a tapped hole 120 substantially perpendicular to its axis. A threaded rod 121 screws in or out of the said hole when imparted with a rotation movement. Said rotation movement is imparted thereon by the output shaft of a reducer 122, which shaft is driven by a motor 123. The motor-reducer unit is electrical and secured to a frame or cradle 124. Said frame 124 is pivotally mounted in 125 on a vertical element 126 serving as a slide member in the vertical guide 108. The figures do not explain the fact that the guide 108 is telescopic and can be constantly extended between the platform 104, on which it is hingedly mounted, and the base 103 and this whatever the distance between them. Also to be noted is that the threaded rod 121 is immobilized in translation in 127 where it meets the said frame 124. The same device 121a, 122a, 123a is of course contained in the frame 124 for driving the compass 105b.

The power reducing units may be controlled separately or together by means of electrical switches 115a (see FIG. 5), placed for example on the level of the shelf 115 and manually actuated by the operator. In this way, it is possible to control, at will, the four movements according to arrows A, B, C, D.

Within the spirit of the nut-and-screw system, such as shown in FIGS. 6 and 7, a hand control means may also be provided to control the rotation of rods 121, 121a, such as cranks and pinions.

It is also possible to ensure the variation of the angle of the compasses by means of a pin driven with a translation of movement about its axis. Said movement can be imparted thereon by a jack (a hydraulic, pneumatic or electric jack) or in the manner of a powered or hand-operated rack and pinion system.

The arrangements proposed by the invention offer many advantages. First of all, the support proposes a combination of adjustments permitting to adapt the station specifically, easily and instantly to the morphology of the operator.

For example, as illustrated in FIG. 9, by adjusting the height of the shelf 115, supporting the keyboard, relatively to the height of the seat 128 and to the reclining position of its backrest, the operator can be installed in the optimum position with respect to the keyboard 1. Also, the height of the luminous screen receiver placed on platform 8 or 10, its inclination and finally its angular position with respect to the column 4 or 101, may be controlled by the mechanisms described hereinabove.

Such adjustments permit, first of all, to cover all the types of receivers currently found on the market, and the dimensions of which vary considerably with each one. This possibility is ensured by the raising up or down of the platform 8 or 104 with respect to the shelf 11 or 115. In this way, the angle e formed by the two lines of vision 132, 133 is reduced to a minimum, and the operator is able to scan the keyboard and the screen with a minimum of movements of the head.

By adjusting the inclination, it is possible, first to position the screen substantially perpendicularly to the line of vision 132 thereby avoiding optical deformations of the characters displayed and possible errors, and second, to eliminate any brightness appearing on the screen thereby facilitating reading and reducing eyestrain.

Reflections are also noticeably reduced by covering the platform 8 or 104 with a dull-finished layer 8a or 104a, and in particular a layer of cellular foam material which constitutes a gripping element for the screen receiver, preventing it from slipping when the platform is tilted, said receiver simply resting on the said platform.

Finally, it is possible, by adjusting the rotation of the assembly about column 4 or 101, first to direct the screen so as to place it in an area wherein the room lighting does not shine on the screen, and second, when the locking mechanism is released, to allow two, three or even four operators, seated radially with respect therewith, to use it, each one drawing it towards him by means of a handrail 25 (see FIG. 3).

Lastly FIG. 10, which illustrates a version of the station without a handrail, shows that the shelf 115 is crescent-shaped and thus offers a large working surface over which the keyboard can be moved, and accessories such as registers 3 or lighting equipment can be placed. It will also be noted that the whole unit is inscribed in a circle which is defined, over more than half its circumference, by the outer edge of the table 115. In this way there is no salient angle projecting from the said circle which offers the advantage of preventing any knocks between the unit and objects or people close to, when said unit is rotated.

The invention is advantageously applied in the field of office furniture. It is not limited to the description given hereinabove but on the contrary covers any variant that can be made thereto without departing from its scope or its spirit.

What is claimed is:

1. A terminal station for the input and output of data issued from and directed to a central processor, such as a computer for example, constituted by a hand-operated input device of the keyboard type and by an output device which the operator can read over, the input and output devices being separate one from the other, comprising a vertically stationary support for the said input device and a support for the said output device, wherein the support for the said output device comprises a platform connected to a mechanism for adjusting its height and its inclination, which mechanism is mounted for rotation about a vertical axis in a lower base with means for immobilizing it in rotation in said base, the main part of said platform being excentered in a horizontal projection with respect to said vertical axis and wherein: the support for the said input device comprises a jamb, fast with a part of the said mechanism which is only rotatable with respect to the said base, shaped at its upper part into a console supporting a horizontal panel cut so as to surround at least part of the said platform and to be substantially inscribed in a circle centered on said vertical axis and surrounding the support for the output device.

2. A terminal station as claimed in claim 1, wherein the said mechanism is constituted by a lower horizontal base-plate over-hangingly attached to the upper end of a vertical column pivotally mounted in the said base and by a system of hinged arms forming at least two compasses extending between the said platform and the said base-plate and forming therewith, from an elevational standpoint, a deformable hinged hexagon, whereas a member for controlling and adjusting the aperture of each of the said compasses is coupled between the latter and a fixed member, fast with the said support.

3. A terminal station as claimed in claim 2, wherein the hinged arms system comprises two double compasses, each double compass being formed by two parallel compasses spaced apart crosswise and connected together by a cross-member situated at the level of their hinged connection.

4. A terminal station as claimed in claim 3, wherein the said control and adjusting member is constituted by a threaded rod cooperating by one of its ends with a tapped hole provided in the said cross-member perpendicular to its axis and coupled by its other end to a member of its rotation means, which is itself connected to the support via a hinged connection whose axis is adapted to be moved in a fixed vertical guide.

5. A terminal station as claimed in claim 4, wherein the said rotation means is constituted by an electrical motor.

6. A station as claimed in claim 2, wherein the said inclinable support device is contained in a concertina-type housing extending between the said jamb and the said platform.

7. A station as claimed in claim 1, wherein the said mechanism is constituted by a column adjustably mounted for vertical sliding and for rotation in the said stand, the upper part of the said column being fitted with a casing forming support for the pivoting axis of the said platform, which is provided with an extension extending into the casing beyond the pivoting axis, whereas means for adjusting the inclination of the platform are constituted by a screw-and-nut system of which the screw is immobilized in translation in the casing and the nut is fast with the said extension.

8. A station as claimed in claim 1, wherein the platform is covered with a non-slip material such as a plastic foam.

9. A station as claimed in claim 1, wherein a horizontal handrail is provided at the level of the panel supporting the input device, along the said circle and integral with the rotating part of the unit, the said handrail being interrupted over a length corresponding to the zone of access to the input device.

10. A station as claimed in claim 1, wherein said station is surrounded by a substantially cylindrical screen along and said circle, which screen is of vertical axis and connected to the rotatable part of the station and open laterally on the side of the shelf to create an access to the input device.

11. A station as claimed in claim 1, wherein the said stand and the rotatable part of the station are provided with stop means which cooperate to limit the angle of rotation to slightly less than 360°.

12. A terminal station for a computer having an input device and a separate output device, said station comprising:
- a base;
- a horizontal panel on said base for supporting said input device and including a cut-out portion, said panel being rotatably movable relative to said base about a first vertical axis;
- a platform on said base for supporting said output device and disposed within said cut-out portion, said platform being rotatably movable with said panel relative to said base about said first vertical axis, said platform being further vertically movable and tiltably movable relative to said panel on a second vertical axis horizontally displaced from said first vertical axis;
- and means for releasably securing said panel and said platform in positions into which they are moved.

* * * * *